(12) United States Patent
Carter

(10) Patent No.: US 8,439,016 B2
(45) Date of Patent: May 14, 2013

(54) LIQUEFIED PETROLEUM GAS ENGINE ASSEMBLY WITH FLOW CONTROL

(75) Inventor: Nicholas Carter, Fairfield (AU)

(73) Assignee: GM Global Technology Operations LLC

( * ) Notice: Subject to any disclaimer, the term of this patent is extended or adjusted under 35 U.S.C. 154(b) by 635 days.

(21) Appl. No.: 12/638,075

(22) Filed: Dec. 15, 2009

(65) Prior Publication Data

US 2011/0139122 A1 Jun. 16, 2011

(51) Int. Cl.
*F02M 37/20* (2006.01)
*F02M 21/02* (2006.01)

(52) U.S. Cl.
USPC ........... 123/462; 123/456; 123/458; 123/511; 123/514; 123/516; 123/525

(58) Field of Classification Search .................. 123/456, 123/462, 179.9, 445, 446, 447, 458, 510, 123/511, 514, 516, 525
See application file for complete search history.

(56) References Cited

U.S. PATENT DOCUMENTS

| | | | | |
|---|---|---|---|---|
| 4,187,813 A | * | 2/1980 | Stumpp | 123/510 |
| 5,425,342 A | * | 6/1995 | Ariga et al. | 123/456 |
| 5,479,906 A | * | 1/1996 | Collie | 123/525 |
| 5,967,119 A | * | 10/1999 | Burkhard et al. | 123/458 |
| 6,035,837 A | * | 3/2000 | Cohen et al. | 123/575 |
| 6,085,728 A | * | 7/2000 | Grosser et al. | 123/447 |
| 6,250,290 B1 | * | 6/2001 | Mullen | 123/541 |
| 7,353,798 B2 | * | 4/2008 | Tokuda et al. | 123/295 |
| 7,774,125 B2 | * | 8/2010 | Scharfenberg | 701/103 |
| 7,942,130 B2 | * | 5/2011 | Briggs et al. | 123/447 |
| 8,122,871 B2 | * | 2/2012 | Tashima et al. | 123/514 |
| 2003/0037768 A1 | * | 2/2003 | Kanne et al. | 123/446 |
| 2011/0144886 A1 | * | 6/2011 | Carter | 701/103 |

FOREIGN PATENT DOCUMENTS

WO WO00/26521 5/2000

* cited by examiner

*Primary Examiner* — Mahmoud Gimie
*Assistant Examiner* — David Hamaoui
(74) *Attorney, Agent, or Firm* — Harness, Dickey & Pierce, P.L.C.

(57) ABSTRACT

A liquefied petroleum gas (LPG) fuel assembly may include a fuel rail and a flow control mechanism. The fuel rail may have an inlet in communication with a pressurized LPG fuel source, an injection passageway in communication with the inlet and a fuel injector that provides fuel to a combustion chamber of an engine, and an outlet in communication with the fuel injection passageway. The flow control mechanism may be in communication with the outlet of the fuel rail and a LPG fuel tank and may be operable in first and second modes. The second mode may provide a greater flow restriction than the first mode to control a fuel flow from the outlet of the fuel rail to the fuel tank.

8 Claims, 2 Drawing Sheets

LIQUEFIED PETROLEUM GAS ENGINE ASSEMBLY WITH FLOW CONTROL

FIELD

Figure 1:
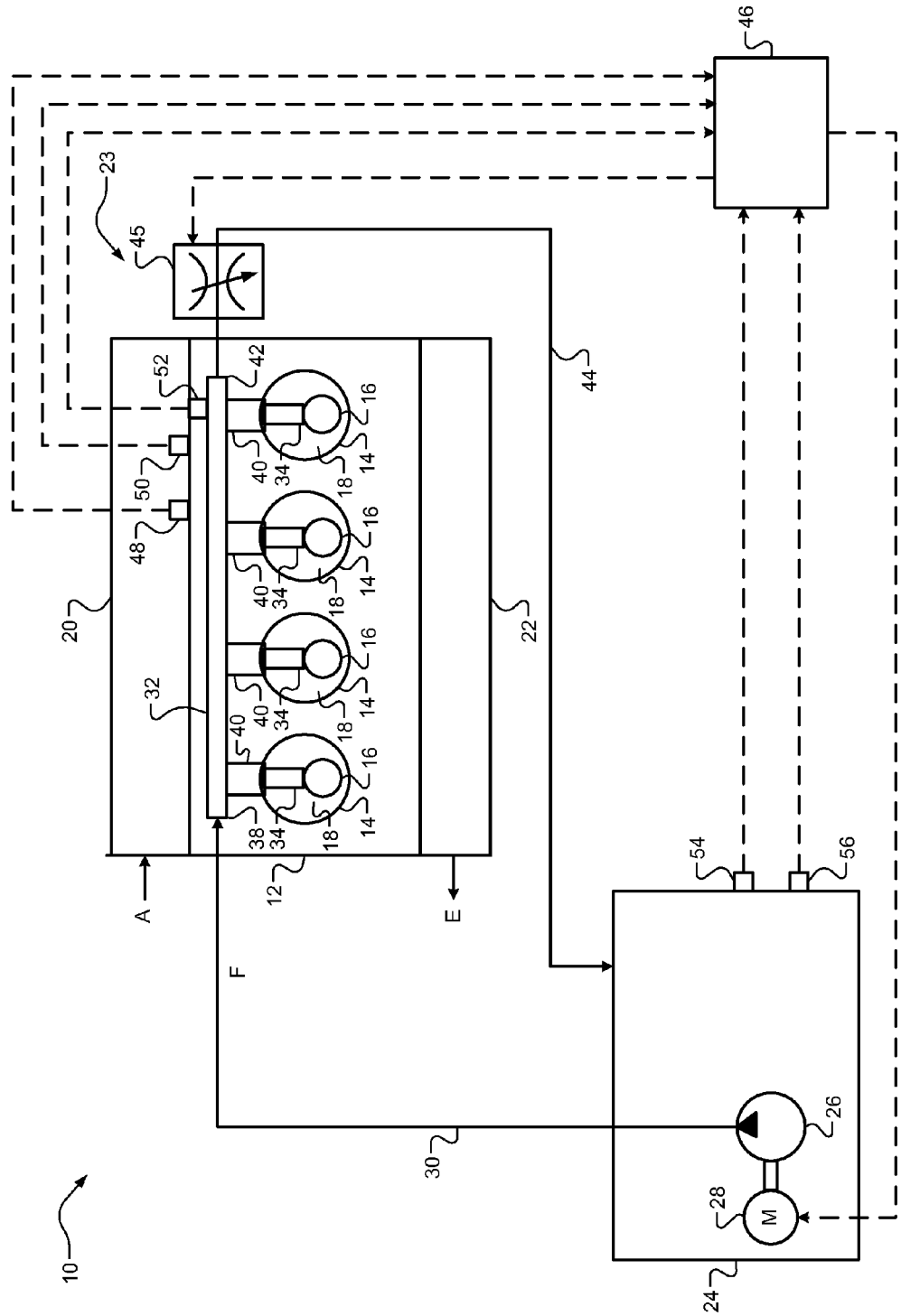

The present disclosure relates to engine assemblies, and more specifically to liquefied petroleum gas engine assemblies with fuel flow control.

BACKGROUND

The statements in this section merely provide background information related to the present disclosure and may not constitute prior art.

Liquefied petroleum gas (LPG) engine assemblies may include a fuel rail attached to fuel injectors that inject liquid fuel into a combustion chamber or into an injection port in communication with the combustion chamber. LPG engine assemblies may also include a pump that circulates fuel from a fuel tank through the fuel rail. In warm conditions, fuel in the fuel rail may be heated to a vapor state. Thus, the pump may circulate fuel through the fuel rail prior to engine startup to purge vapor fuel in the fuel rail. This purge of vapor fuel in the fuel rail increases the time required for engine startup.

During engine operation, the pump may pressurize fuel supplied to the fuel rail to maintain fuel in the fuel rail in a liquid state. Operating the pump may increase fuel consumption and cause noise.

SUMMARY

An engine assembly may include an engine structure defining a combustion chamber and a liquefied petroleum gas (LPG) fuel assembly including a fuel tank, a fuel pump, a fuel rail, a fuel injector, and a flow control mechanism. The fuel tank may contain LPG fuel and the fuel pump may be in communication with the LPG fuel. The fuel rail may have an inlet in communication with the fuel pump, an injection passageway in communication with the inlet, and an outlet in communication with the fuel injection passageway. The fuel injector may be in communication with the fuel injection passageway and the combustion chamber. The flow control mechanism may be in communication with the outlet of the fuel rail and the fuel tank and may be operable in first and second modes. The second mode may provide a greater flow restriction from the fuel rail to the fuel tank than the first mode to control a fuel flow from the outlet of the fuel rail to the fuel tank.

A method of controlling LPG fuel supply may include providing pressurized LPG fuel to an inlet of a fuel rail, distributing the LPG fuel to a fuel injector through an injection passageway of the fuel rail that is in communication with the inlet, controlling LPG fuel flow exiting the fuel rail through a fuel rail outlet via a flow control mechanism in communication with the outlet of the fuel rail and a fuel tank in first and second modes, the second mode providing a greater flow restriction than the first mode to control a fuel flow from the outlet of the fuel rail to the fuel tank.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
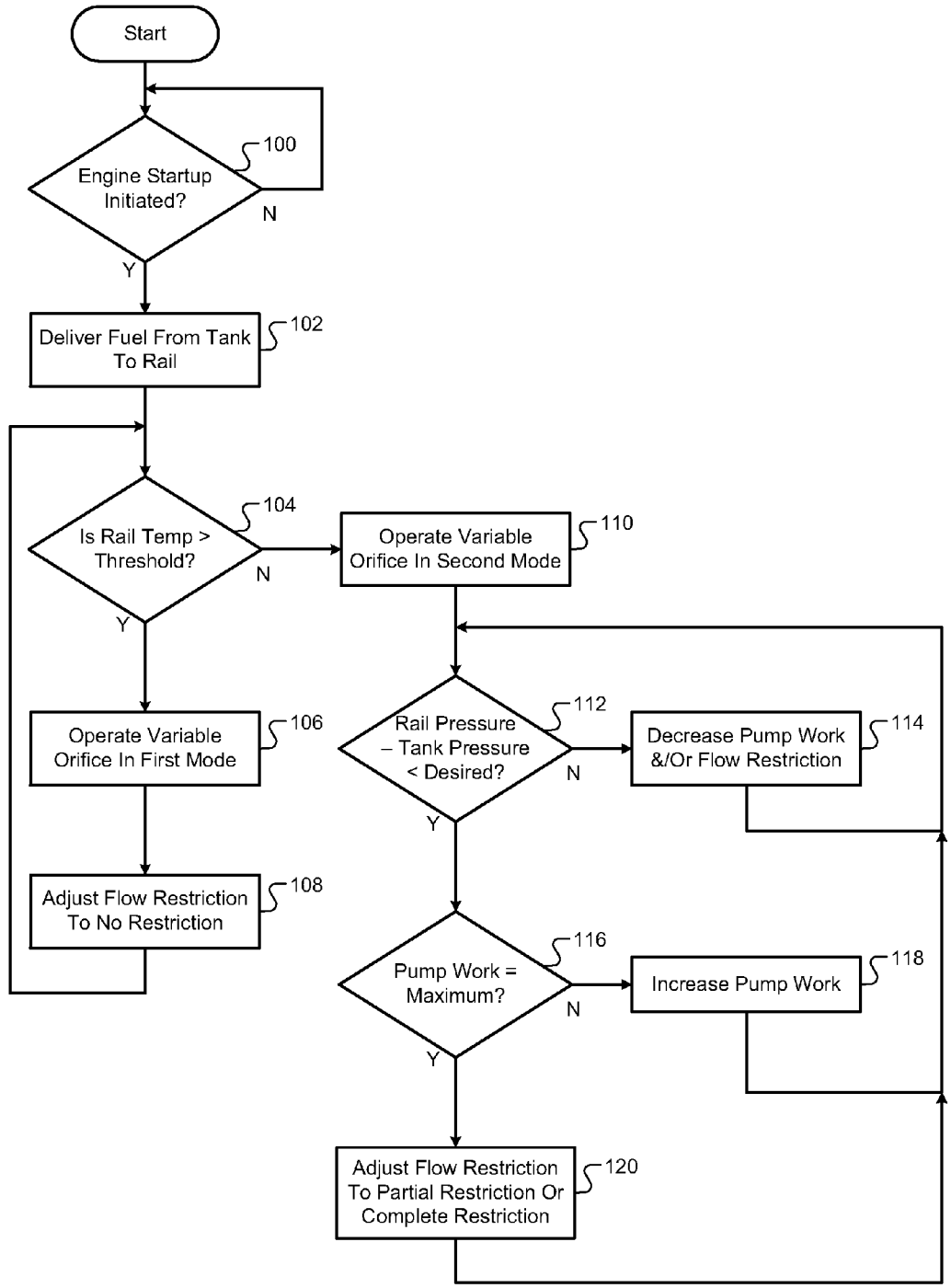

FIG. 1 is a schematic illustration of an engine assembly according to the present disclosure; and FIG. 2 is a flowchart illustrating operation of the engine assembly according to the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may form a liquefied petroleum gas (LPG) engine assembly including an engine structure 12 defining cylinder bores 14 and injection ports 16, pistons 18, an intake manifold 20, an exhaust manifold 22, and a fuel assembly 23. The engine structure 12 may include an engine block that defines the cylinder bores 14 and a cylinder head that defines the injection ports 16. While the engine assembly 10 is illustrated as including an inline four cylinder engine, it is understood that the present disclosure applies equally to engines having any number of cylinders and arrangements including, but not limited to, inline and V-engines.

The pistons 18 may be disposed within the cylinder bores 14 for reciprocal displacement therein. The intake manifold 20 may be in communication with the cylinder bores 14 to provide airflow (indicated by arrow A) into the cylinder bores 14. The exhaust manifold 22 may be in communication with the cylinder bores 14 to transport exhaust gases (indicated by arrow E) away from the cylinder bores 14.

The fuel assembly 23 may form a LPG fuel assembly including a fuel tank 24, a fuel pump 26, a motor 28, a fuel supply line 30, a fuel rail 32, fuel injectors 34, a fuel return line 44, and a flow control mechanism 45. The fuel pump 26 and the motor 28 may be located in the fuel tank 24. The fuel tank 24 may form an LPG tank and may store LPG therein. The fuel pump 26 may be driven by the motor 28 and may generate a fuel flow (indicated by arrow F) from the fuel tank 24 through the fuel supply line 30.

The fuel rail 32 may include an inlet 38 in communication with the fuel supply line 30, and injection passageways 40 in communication with the inlet 38 and an outlet 42 of the fuel rail 32. The fuel injectors 34 may be in communication with the injection passageways 40. The fuel rail 32 may receive fuel flow from the fuel pump 26 and distribute fuel to the fuel injectors 34. The fuel injectors 34 may provide fuel to the cylinder bores 14. By way of non-limiting example, the fuel injectors 34 may inject fuel directly into the cylinder bores 14. Alternatively, the fuel injectors 34 may inject fuel into the injection ports 16 and reciprocal movement of the pistons 18 within the cylinder bores 14 may create a vacuum that draws the fuel from injection ports 36 into the cylinder bores 14.

The fuel return line 44 may be in communication with the outlet 42 and the fuel tank 24 and may return fuel from the fuel rail 32 to the fuel tank 24. The flow control mechanism 45 may be in communication with and located between the outlet 42 and the fuel tank 24. By way of non-limiting example, the flow control mechanism 45 may be located between the outlet 42 and the fuel return line 44, between the fuel return line 44 and the fuel tank 24, or within the fuel return line 44.

By way of non-limiting example, the flow control mechanism 45 may include a variable orifice and may provide a variable flow restriction between the outlet 42 and the fuel tank 24. The variable flow restriction may be varied between no restriction, complete restriction (i.e., no flow), and any restriction therebetween.

The engine assembly 10 may further include a control module 46, a coolant temperature sensor 48, an oil temperature sensor 50, a fuel rail pressure sensor 52, a fuel tank temperature sensor 54, and a fuel tank pressure sensor 56. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. The control module 46 may control operation of the motor 28 and the flow control mechanism 45. By way of non-limiting example, the control module 46 may control operation of the motor 28 and the flow control mechanism 45 via pulse width modulation (PWM) of signals sent thereto.

The coolant temperature sensor 48 and the oil temperature sensor 50 may provide signals to the control module 46 that respectively indicate the temperature of oil in the engine structure 12 and the temperature of coolant in the engine structure 12. The fuel rail pressure sensor 52, the fuel tank temperature sensor 54, and the fuel tank pressure sensor 56 may provide signals to the control module 46 that respectively indicate the pressure of fuel in the fuel rail 32, the temperature of fuel in the fuel tank 24, and the pressure of fuel in the fuel tank 24.

Operation of the fuel assembly 23 is illustrated in the control logic shown in FIG. 2. Control module 46 may determine when engine startup is initiated in step 100 based on a signal received from an ignition system. Engine startup may be initiated when a driver turns an ignition key to a start position. Control module 46 may activate the motor 28 to drive the fuel pump 26 in step 102 when engine startup is initiated and provide fuel flow to the fuel rail 32 via the fuel supply line 30. In turn, the fuel flow may travel through the fuel rail 32, the flow control mechanism 45, and the return line 44.

Control module 46 may determine whether the temperature of the fuel rail 32 is greater than a temperature threshold in step 104. The temperature threshold may be a temperature at which fuel in the fuel rail 32 transitions from liquid to vapor. The temperature threshold may be a predetermined value based on the pressure in the fuel rail 32 received from the fuel rail pressure sensor 52.

Control module 46 may determine the temperature of the fuel rail 32 based on the coolant temperature from the coolant temperature sensor 48, the oil temperature from the oil temperature sensor 50, and an engine-off period. The engine-off period may be a period of time during which the engine assembly 10 is shutoff. Control module 46 may determine the temperature of the fuel rail 32 based on a predetermined relationship between the coolant and oil temperatures when the engine assembly 10 is initially shut off, the engine-off period, and the temperature of the fuel rail 32.

Control module 46 may operate the flow control mechanism 45 in a first mode in step 106 when the temperature of the fuel rail 32 is greater than the temperature threshold. In step 108, the flow control mechanism 45 may adjust to a first position to provide a first flow restriction. By way of non-limiting example, the first position may be a fully open position (e.g., 100 percent open), a partially open position (e.g., 95 percent open), and any position therebetween. The first flow restriction may provide limited or no restriction of the fuel flow traveling through the flow control mechanism 45.

Control module 46 may continue to operate the flow control mechanism 45 in the first mode when the temperature of the fuel rail 32 is greater than the temperature threshold. In this manner, the LPG engine assembly of the present disclosure may minimize the time required to purge a rail of vapor LPG during a hot start (i.e., engine startup when outside temperatures are hot) and during a short soak restart (i.e., engine startup following a short engine-off period). In turn, the time required for engine startup during hot start or short soak restart may be minimized.

Control module 46 may operate the flow control mechanism 45 in a second mode in step 110 when the temperature of the fuel rail 32 is less than or equal to the temperature threshold. In the second mode, the flow control mechanism 45 may adjust to a second position to provide a second flow restriction that is greater than the first flow restriction. By way of non-limiting example, the second position may be a fully closed position (e.g., 0 percent open), a partially closed position (e.g., 90 percent open), and any position therebetween. The second flow restriction may partially or completely restrict the fuel flow traveling through the flow control mechanism 45, thereby limiting fuel flow from the fuel rail 32 to the fuel tank 24, which increases the pressure in the fuel rail 32.

Control module 46 may determine whether a difference between the pressure in the fuel rail 32 and the pressure in the fuel tank 24 is less than a desired pressure difference in step 112. The difference between the pressure in the fuel tank 24 and the pressure in the fuel rail 32 may be referred to as a system pressure head. The desired pressure difference may be predetermined to maintain the fuel flow traveling through the fuel rail 32 in a liquid state.

Control module 46 may determine the pressure in the fuel rail 32 and the pressure in the fuel tank 24 based on the signals received from the fuel rail pressure sensor 52 and the fuel tank pressure sensor 56, respectively. Alternatively, the pressure in the fuel rail 32 may be determined based on the coolant temperature from the coolant temperature sensor 48, the oil temperature from the oil temperature sensor 50, and the engine-off period using the methods discussed above in reference to determining the temperature of the fuel rail 32. In addition, the pressure in the fuel tank 24 may be a predetermined value based on a fuel temperature and a type of fuel. By way of non-limiting example, the pressure in the fuel tank 24 may range from 350 kPa to 1400 kPa when the fuel temperature ranges from −10 degrees Celsius to 40 degrees Celsius and the type of fuel contained in the fuel tank 24 is propane. The fuel temperature may be determined based on an ambient temperature.

Control module 46 may decrease a work output of the fuel pump 26 and/or adjust the flow control mechanism 45 to decrease a restriction of the fuel flow in step 114 when the system pressure head is greater than the desired pressure difference. Control module 46 may adjust the work output of the fuel pump 26 by adjusting the duty cycle of the signal sent to the motor 28. The work output of the fuel pump 26 and/or the restriction of the fuel flow traveling through the flow control mechanism 45 may be decreased to decrease the pressure in the fuel rail 32. The pressure in the fuel rail 32 may be decreased until the system pressure head is greater than the desired pressure difference.

Control module 46 may determine whether the work output of the fuel pump 26 is equal to a maximum work output in step 116 when the system pressure head is less than desired. The work output of the fuel pump 26 may be equal to the maximum work output when a duty cycle of a PWM signal sent to the motor 28 is 100 percent. Control module 46 may increase the work output of the fuel pump 26 by increasing the duty cycle of the PWM signal sent to the motor 28 in step 118 when the work output of the fuel pump 26 is less than the maximum work output. In addition, control module 46 may maintain the flow control mechanism 45 in the fully open position, the partially open position, or positions therebetween when the work output of the fuel pump 26 is less than the maximum work output.

The flow control mechanism 45 may be adjusted to the partially closed position or the fully closed position in step 120 when the work output of the fuel pump 26 is equal to the maximum work output. Control module 46 may continue to restrict the fuel flow traveling through the flow control mechanism 45 until the system pressure head is greater than or equal to the desired pressure difference.

In this manner, an increased system pressure head may be achieved for a fuel pump. Increasing the achievable system pressure head may be desirable during certain conditions such as post purge (i.e., period after rail purge and before engine startup) and normal driving (i.e., engine operating). This minimizes the amount of pump work necessary to achieve a system pressure head that maintains liquid LPG in a rail, which reduces fuel consumption and eliminates noise.

In addition, an increased system pressure head may be beneficial during post purge to reliably start an engine. The LPG engine assembly of the present disclosure provides the ability to maximize the system pressure head and to minimize the time required to achieve the increase system pressure head. In turn, the reliability of engine startup may be improved and the time required for engine startup may be reduced.

Moreover, locating a flow control device adjacent to an outlet end of a fuel rail minimizes the length of fuel line to be purged, which minimizes the fuel to be purged. This further reduces the period required for engine startup.

What is claimed is:

1. A liquefied petroleum gas (LPG) fuel assembly comprising:
    a fuel rail having an inlet in communication with a pressurized LPG fuel source, a fuel injection passageway in communication with the inlet and a fuel injector that provides fuel to a combustion chamber of an engine, and an outlet in communication with the fuel injection passageway; and
    a flow control mechanism including a variable orifice in communication with the outlet of the fuel rail and a LPG fuel tank and operable in a first mode when a temperature in the fuel rail is greater than a threshold temperature that indicates a fuel transition from a liquid state to a vapor state and a second mode when the temperature in the fuel rail is less than or equal to the threshold temperature, the first mode provides purging of LPG fuel from the fuel rail by opening the variable orifice valve beyond a predetermined amount and the second mode providing a greater flow restriction than the first mode to control a fuel flow from the outlet of the fuel rail to the fuel tank and the variable orifice providing an adjustable restriction during the second mode to achieve a pressure in the fuel rail that maintains LPG fuel flowing through the fuel rail in a liquid state.

2. The LPG fuel assembly of claim 1, wherein the flow control mechanism is located adjacent to the outlet of the fuel rail.

3. The LPG fuel assembly of claim 1, wherein the flow control mechanism defines a flow area and adjusts to a first position in the first mode that provides an opening of between 95 percent and 100 percent of the flow area and adjusts to a second position in the second mode that provides an opening of between 0 percent and 90 percent of the flow area.

4. An engine assembly comprising:
    an engine structure defining a combustion chamber; and
    a liquefied petroleum gas (LPG) fuel assembly including:
    a fuel tank containing LPG fuel;
    a fuel pump in communication with the LPG fuel;
    a fuel rail having an inlet in communication with the fuel pump, a fuel injection passageway in communication with the inlet, and an outlet in communication with the fuel injection passageway;
    a fuel injector in communication with the fuel injection passageway and the combustion chamber; and
    a flow control mechanism including a variable orifice in communication with the outlet of the fuel rail and the fuel tank and operable in a first mode when a temperature in the fuel rail is greater than a threshold temperature that indicates a fuel transition from a liquid state to a vapor state and a second mode when the temperature in the fuel rail is less than or equal to the threshold temperature, the first mode provides purging of LPG fuel from the fuel rail by opening the variable orifice valve beyond a predetermined amount and the second mode providing a greater flow restriction from the fuel rail to the fuel tank than the first mode to control a fuel flow from the outlet of the fuel rail to the fuel tank and the variable orifice providing an adjustable restriction during the second mode to achieve a pressure in the fuel rail that maintains LPG fuel flowing through the fuel rail in a liquid state.

5. The engine assembly of claim 4, wherein the flow control mechanism is located adjacent to the outlet of the fuel rail.

6. The engine assembly of claim 4, wherein the flow control mechanism defines a flow area and adjusts to a first position in the first mode that provides an opening of between 95 percent and 100 percent of the flow area and adjusts to a second position in the second mode that provides an opening of between 0 percent and 90 percent of the flow area.

7. A method comprising:
    providing pressurized liquefied petroleum gas (LPG) fuel to an inlet of a fuel rail;
    distributing the LPG fuel to a fuel injector through an injection passageway of the fuel rail that is in communication with the inlet;
    determining a temperature of LPG fuel in the fuel rail; and
    controlling LPG fuel flow exiting the fuel rail through a fuel rail outlet via a flow control mechanism including a variable orifice in communication with the outlet of the fuel rail and a fuel tank in a first mode when a temperature in the fuel rail is greater than a threshold temperature that indicates a fuel transition from a liquid state to a vapor state and a second mode when the temperature in the fuel rail is less than or equal to the threshold temperature, the first mode provides purging of LPG fuel from the fuel rail by opening the variable orifice valve beyond a predetermined amount and the second mode providing a greater flow restriction than the first mode and the variable orifice providing an adjustable restriction during the second mode to achieve a pressure in the fuel rail that maintains LPG fuel flowing through the fuel rail in a liquid state.

8. The method of claim 7, wherein the flow control mechanism is located adjacent to the outlet of the fuel rail.

* * * * *